(12) United States Patent
Benson et al.

(10) Patent No.: US 8,984,276 B2
(45) Date of Patent: Mar. 17, 2015

(54) SYSTEM AND METHOD FOR DEVICE REGISTRATION AND AUTHENTICATION

(75) Inventors: Glenn Benson, Newton, MA (US); Salvatore Richard Re, Westfield, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 323 days.

(21) Appl. No.: 13/492,126

(22) Filed: Jun. 8, 2012

(65) Prior Publication Data

US 2013/0179681 A1 Jul. 11, 2013

Related U.S. Application Data

(60) Provisional application No. 61/585,057, filed on Jan. 10, 2012.

(51) Int. Cl.
*H04L 29/06* (2006.01)
*H04L 9/32* (2006.01)

(52) U.S. Cl.
CPC ............ *H04L 9/3231* (2013.01); *H04L 9/3234* (2013.01); *H04L 9/3247* (2013.01); *H04L 63/08* (2013.01); *H04L 2209/80* (2013.01); *H04L 2463/062* (2013.01); *H04L 2463/082* (2013.01)
USPC ........................................................ 713/155

(58) Field of Classification Search
CPC .................. H04L 2463/062; H04L 2463/082; H04L 9/3231; H04L 9/3234; H04L 9/3247
USPC ........................................................ 713/155
See application file for complete search history.

(56) References Cited

U.S. PATENT DOCUMENTS

| | | | |
|---|---|---|---|
| 6,275,934 B1 * | 8/2001 | Novicov et al. | 713/168 |
| 6,925,182 B1 * | 8/2005 | Epstein | 380/277 |
| 7,308,261 B2 | 12/2007 | Henderson et al. | |
| 7,522,751 B2 | 4/2009 | White et al. | |
| 7,545,961 B2 | 6/2009 | Altern et al. | |
| 7,545,962 B2 | 6/2009 | Peirce et al. | |
| 7,591,008 B2 | 9/2009 | Nalliah et al. | |
| 7,676,439 B2 | 3/2010 | Tattan et al. | |

(Continued)

FOREIGN PATENT DOCUMENTS

EP 1710980 10/2006

OTHER PUBLICATIONS

International Search Report Dated Jan. 4, 2013 for International Application No. PCT/US2012/054751.

(Continued)

*Primary Examiner* — Chau Le
(74) *Attorney, Agent, or Firm* — Hunton & Williams LLP

(57) ABSTRACT

Systems and methods for device registration and authentication are disclosed. In one embodiment, a method for authentication of a device may include (1) receiving, at a mobile device, a first credential; (2) transmitting, over a network, the first credential to a server; (3) receiving, from the server, a first key and a first value, the first value comprising a receipt for the first credential; (4) receiving, at the mobile device, a data entry for a second credential; (5) generating, by a processor, a second key from the data entry; (6) retrieving, by the mobile device, a third credential using the first key and the second key; (7) signing, by the mobile device, the first value with the third credential; and (8) transmitting, over the network, the signed third value to the server.

30 Claims, 12 Drawing Sheets

(56) References Cited

U.S. PATENT DOCUMENTS

| | | |
|---|---|---|
| 7,685,629 B1 | 3/2010 | White et al. |
| 7,690,032 B1 | 3/2010 | Peirce |
| 7,698,322 B1 | 4/2010 | Langley |
| 7,702,918 B2 | 4/2010 | Tattan et al. |
| 7,835,548 B1 | 11/2010 | Langley |
| 7,865,449 B2 | 1/2011 | Tattan et al. |
| 7,865,937 B1 | 1/2011 | White et al. |
| 7,941,380 B2 | 5/2011 | Tattan et al. |
| 8,031,981 B2 | 10/2011 | Peirce |
| 8,041,956 B1 | 10/2011 | White et al. |
| 8,064,645 B1 | 11/2011 | Sezille |
| 8,085,992 B1 | 12/2011 | Sahin et al. |
| 2003/0140257 A1* | 7/2003 | Peterka et al. ............... 713/201 |
| 2005/0235148 A1* | 10/2005 | Scheidt et al. ............... 713/168 |
| 2007/0043945 A1* | 2/2007 | Choi et al. ............... 713/168 |
| 2009/0164796 A1 | 6/2009 | Peirce |
| 2010/0312703 A1 | 12/2010 | Kulpati et al. |
| 2010/0312763 A1 | 12/2010 | Peirce |
| 2011/0059727 A1 | 3/2011 | Lisboa |
| 2011/0209200 A2 | 4/2011 | White et al. |
| 2011/0131638 A1* | 6/2011 | Kan ............................... 726/6 |
| 2012/0131331 A1* | 5/2012 | Benson ........................ 713/155 |

OTHER PUBLICATIONS

Written Opinion of the International Searching Authority Dated Jan. 4, 2013 for International Application No. PCT/US2012/054751.

* cited by examiner

SYSTEM AND METHOD FOR DEVICE REGISTRATION AND AUTHENTICATION

RELATED APPLICATIONS

This patent application is related to U.S. Provisional Patent Application Ser. No. 61/585,057, filed Jan. 10, 2012, the disclosure of which is incorporated by reference in its entirety.

BACKGROUND OF THE INVENTION

1. Field of the Invention

The present invention generally relates to the registration and authentication of mobile devices.

2. Description of the Related Art

Two-factor authentication is commonly found in electronic computer authentication, where basic authentication is the process of a requesting entity presenting some evidence of its identity to a second entity. Two-factor authentication seeks to decrease the probability that the requestor is presenting false evidence of its identity. The number of factors is important as it implies a higher probability that the bearer of the identity evidence indeed holds that identity in another realm.

SUMMARY OF THE INVENTION

Systems and methods for device registration and authentication are disclosed. In one embodiment, a method for authentication of a device may include (1) receiving, at a mobile device, a first credential; (2) transmitting, over a network, the first credential to a server; (3) receiving, from the server, a first key and a first value, the first value comprising a receipt for the first credential; (4) receiving, at the mobile device, a data entry for a second credential; (5) generating, by a processor, a second key from the data entry; (6) retrieving, by the mobile device, a third credential using the first key and the second key; (7) signing, by the mobile device, the first value with the third credential; and (8) transmitting, over the network, the signed first value to the server.

In one embodiment, the first credential may include a biometric, and the biometric may be a voice biometric.

The first credential may include a value, a device footprint, a geographic location for the device, etc.

In one embodiment, the first key may be a symmetric key.

In one embodiment, the second key may be generated by applying a cryptographic hash function to the data entry.

In one embodiment, the second key may be an asymmetric key.

In one embodiment, the third credential may be encrypted with the second key, and further encrypted with the first key. The third credential may be an asymmetric key.

The second key may be stored on one of removable memory, a fob, a token, a USB device, etc.

In one embodiment, the method may further include encrypting the first credential before transmitting the first credential to the server.

In another embodiment, the method may further include generating, at the mobile device, a second value; signing the second value with a device key; and transmitting, to the server, the signed second value.

According to another embodiment, a method for authentication may include (1) receiving, from a mobile device and over a network, a first credential; (2) verifying the first credential; (3) transmitting, over the network and to the mobile device, a first key and a first value, the first value comprising a receipt for the first credential; (4) receiving, from the mobile device, the first value signed with a device key; (5) validating the signed first value; and (6) authenticating the user and the mobile device.

In one embodiment, the first credential comprises a biometric.

In one embodiment, the first credential may include a biometric, and the biometric may be a voice biometric.

The first credential may include a value, a device footprint, a geographic location for the device, etc.

In one embodiment, verifying the first credential may include verifying a predetermined number of elements comprising the first credential. This may further include verifying all elements comprising the first credential.

In one embodiment, the first credential may be signed using the device key.

The method may further include transmitting a replacement device key to the mobile device.

In one embodiment, the first value may further include a string to invalidate a transaction signature.

In one embodiment, the step of validating the signed second value may include applying a server key corresponding to a key used to sign the second value to validate the second value.

In another embodiment, a method of registering a mobile device may include (1) receiving, at a server, a request for a registration code to register a mobile device; (2) transmitting, to the authorized device, the registration code; (3) receiving, from the mobile device, the registration code and a mobile device identifier; and (4) authorizing the mobile device.

In one embodiment, the registration code may be an optical, machine-readable code. In one embodiment, the registration code may be a QR code. In another embodiment, the registration code may be an alphanumeric code.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
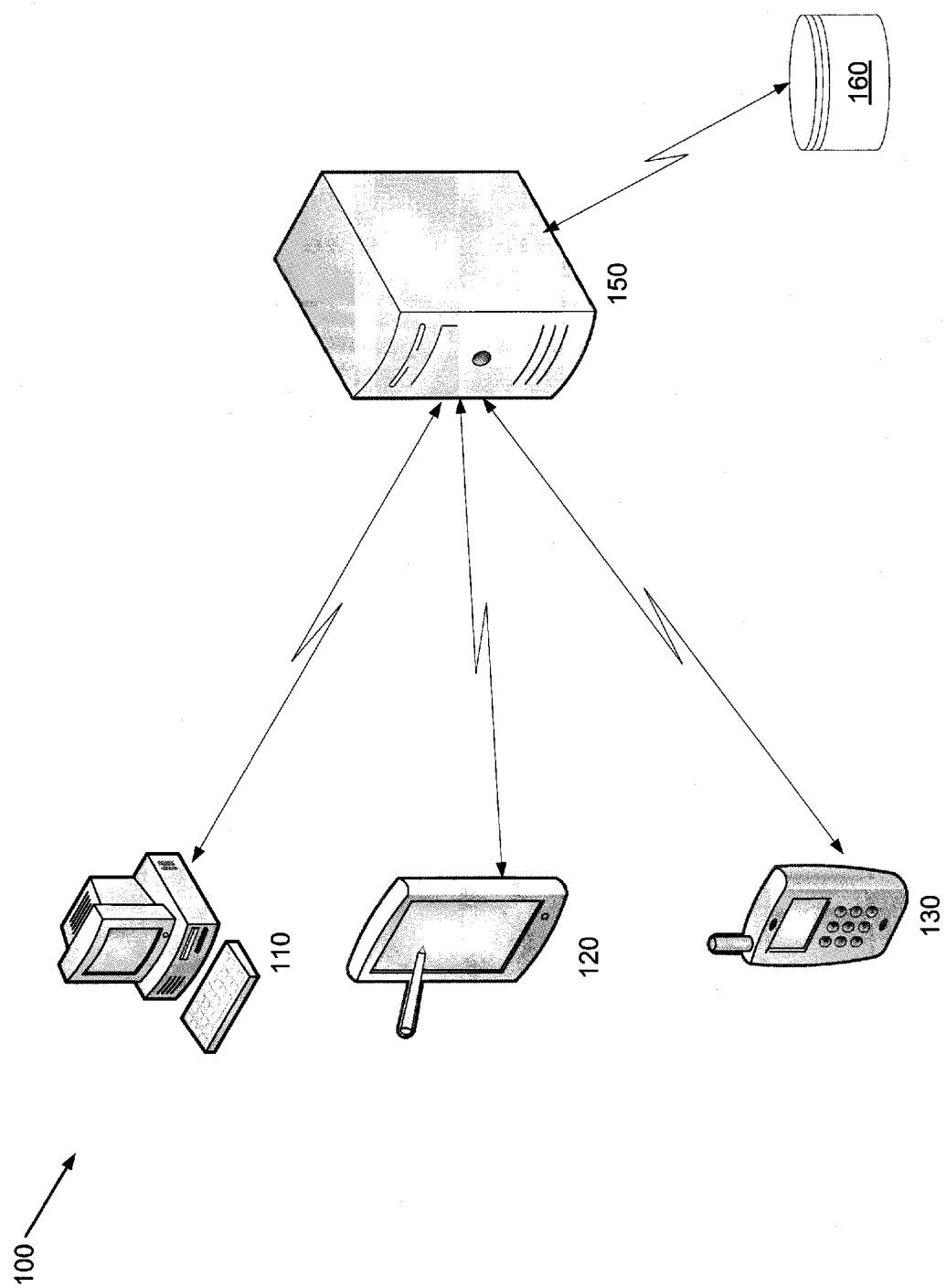
FIG. 1 discloses a block diagram of a system for mobile device registration according to one embodiment.

Several embodiments of the present invention and their advantages may be understood by referring to FIGS. 1-11, wherein like reference numerals refer to like elements.

The disclosures of the following are hereby incorporated, by reference, in their entireties: U.S. Pat. Nos. 7,099,850; 7,103,576; 7,783,578; 6,685,088; 7,448,538; and 7,657,489 and U.S. patent application Ser. Nos. 11/398,281; 11/822,708; 12/421,915; 12/819,673; 12/914,288; 13/168,148; and 13/312,525.

According to one embodiment, a three-factor, or credential, authentication protocol for a user and/or device is disclosed. For example, a first credential may be related to a characteristic of the user. A second credential may be something that is known only to the user (or known only to a limited population), such as a code, pattern, trivia, etc. A third credential may be related to, associated with, or stored on the device that is being registered.

In one embodiment, the first credential may be a physical characteristic, such as a biometric. Examples include a voice biometric, a finger print, a retinal scan, facial recognition, a DNA sample, a palm print, hand geometry, iris recognition, an odor/scent, a typing rhythm, a gait, etc. Any other physical and/or behavioral traits may be used as necessary and/or desired.

In one embodiment, the user may say a word, a passphrase, a sentence, etc. In another embodiment, the user may be instructed on what to say. In another embodiment, the user may speak anything that the user desires. If the entry is not within tolerance, the user may be required to repeat the entry, speak a different phrase, speak the same words possibly in a different order, or provide a different type of entry. In one embodiment, the server may implement a voice biometric authentication where the server validates aspects of the user's voice against characteristics obtained at registration time.

If two different people repeat the same exact phrase, their respective biometric voice prints will be different. Only the properly registered voice would be authenticated. The false reject rate is the rate at which the system denies authentication requests to people who correctly registered. The false accept rate, however, is the rate at which the system accepts authentication requests from a person who is other than the one who registers. In general, biometric verification systems work best when both the false accept rate and the false reject rate are low.

In one embodiment, a user may read words, a number or a sequence of numbers, a phrase, a paragraph, etc. during a registration process, such as during account opening, on-line account activation, etc. to establish a baseline voice recording. In the process of supplying and validating the first credential, the user may be instructed to repeat random words, phrases, numbers, etc. from this baseline voice recording. In one embodiment, the words or phrases may be taken out of their normal order. For example, if the user recorded "Four score and seven years ago," the user may be instructed to repeat "ago", "score" and "seven." The server 150 may match the spoken words against its registered expectations and only accepts the credential if the voice biometric appears to match closely expectations submitted at registration time.

Examples of suitable voice biometric products include VoiceVault Fusion by VoiceVault, VoiceVerified by CSID, VocalPassword™ and FreeSpeech™ from Nuance.

In another embodiment, the first credential may be entered by the user entering a changing code, such as one from a secure token such as the RSA SecureId token. In one embodiment, a hard token (i.e., dedicated physical device) may be used. In another embodiment, a soft (i.e., software) token may be used. In still another embodiment, a cryptographic token with an asymmetric key (i.e., a public/private key token) may be used. In another embodiment another biometric such as a fingerprint may be used. In another embodiment multiple credentials may be used, e.g., both hard token and biometric.

The first credential may also include a client (or mobile) device footprint. This device footprint may include, for example, a type of device (e.g., tablet computer, mobile phone, PDA), a device manufacturer (e.g., Apple, Motorola, etc.), and a model number (e.g., iPhone 3, iPhone 4, iPhone 4s, etc.), device identifier (e.g., a serial number, a MAC address, blue tooth address, etc.). This may assist in registering the device and/or authenticating the user. Further, this may also be used in determining a preferred, or default, method of entry and/or type of third credential.

The device footprint may also include information about an application running on the device (e.g., an application ID, or UID, a revision identifier, etc.). In one embodiment, the device footprint may include a random number placed on the device at registration time, system creation time, or some other time preceding authentication.

The device footprint may also include capabilities for client device. For example, this may include a size of the device (e.g., tablet versus PDA); whether the device has a keypad; whether the device has a camera or other optical input; whether the device has a microphone or other audible input; whether the device can detect scents, etc. Other characteristics may be used as necessary and/or desired.

The first credential may also include a value/code that may be entered by the user or stored on the device. In one embodiment, a Large Password Extension ("LPE") described in U.S. patent application Ser. No. 13/168,148, may be used as or as part of the first credential.

In one embodiment, the first credential may include more than one element discussed above (e.g., voice biometric and large password extension, voice biometric and device footprint, etc.).

The second credential may be based on something that is known only to the user (or known only to a limited population), such as a code, a pattern, trivia, etc. For example, the user may enter a code, a pattern, a sequence of numbers, gestures, etc. For example, the user may drag his or her finger on the screen of the device to recreate a memorized pattern among nine dots. In another embodiment, the user may enter a particular gesture or gestures. In another embodiment, the user may move the device in a certain manner. Other movements, gestures, patterns, etc. may be used as necessary and/or desired. In one embodiment, the gesture may include a sequence of taps of the mobile device such as tapping a morse code letter. Each tap bumps a mobile phone against an object such as the palm of the user's hand.

After the data is captured, the device may generate the second credential. For example, the device may apply a cryptographic hash function, such as Secure Hash Algorithm, or "SHA," to generate a message digest that may be used as the second credential. In one embodiment, SHA-256, meaning a 256-bit message digest, may be used. Other cryptographic hash functions, including other SHA functions, such as SHA-224, SHA-284, and SHA-512 may also be used as necessary and/or desired.

Other examples may be found in Menezes, et al., "Handbook of Applied Cryptography," the disclosure of which is incorporated by reference in its entirety.

In one embodiment, the data entry method for the data used to generate the second credential may be optimized for the specific device that is being registered. For example, if a mobile phone/PDA is being registered, a pattern on a screen may be used instead of a series of keystrokes because it may be more convenient for the user to enter a pattern than to enter a series of key strokes. For a tablet computer, however, due to its larger screen size, a series of keystrokes may be more practical.

In one embodiment, the user may be able to select the way the data used to generate the second credential is entered.

The third credential may be a key that is stored on, or accessed by, the mobile (or client) device. The third credential may be stored in the memory of the device itself, or in a separate device, such as a fob, token, USB device, a smart card, a separate mobile device, etc. that may interact with the device.

In one embodiment, the third credential may be an asymmetric private key (i.e., a key that is part of a key pair that is used to encrypt and decrypt data). A corresponding certificate may also be stored in or accessed by the device to be registered. The user may subsequently apply the private key to digitally sign a random number, and the server may validate the signature against a certificate associated with the user/device.

In another embodiment, the third credential may be a symmetric key stored on or accessed by a device to be registered and on the server. With a symmetric key, the same key is used to encrypt and decrypt data.

In another embodiment, authentication may require a fourth credential, which may be a restriction on a geographical location of the device being registered. In another embodiment, the fourth credential may be used in place of, or in addition to, the first or second credential.

In one embodiment, the geographical restriction may be coarse, e.g., the user must be physically present in the correct country, state, city, etc. at the time of the transaction. In another embodiment, the geographical restriction may be fine-grained, e.g., the user must be physically present in the vicinity of a particular building or place, such as the user's work location, the user's home location, some registered location, etc. at the time of registration.

Referring to FIG. 1, a system for mobile device registration is disclosed. System 100 includes desktop, laptop, or notebook computer 110 (or similar device), tablet computer 120, phone/PDA 130, server 150, and database 160. In one embodiment, server 150 executes code to register desktop or laptop computer 110, tablet computer 120, and/or phone/PDA 130.

In one embodiment, although only a single server and database are depicted, it should be recognized that more than one server, database, etc. may be provided. For example, a separate server may be provided for biometric validation, and a separate database may be provided for storing biometric data. Other servers and databases may be provided as necessary and/or desired.

In one embodiment, a client application (not shown) may be downloaded for any of devices 110-130. In one embodiment, a different version of the application may be provided for mobile devices, such as tablet computer 120 and phone/PDA 130, and immobile devices, such as desktop computer 110. Other versions of the application may be provided as necessary and/or desired.

In one embodiment, any of desktop computer 110, tablet computer 120, phone/PDA 130, server 150, and database 160 can communicate by any suitable communications means. In one embodiment, the communication means may include the Internet, radio frequency, optical (e.g., IR), WiFi, Near Field Communications (NFC), landline, Bluetooth, etc.

Figure 2:
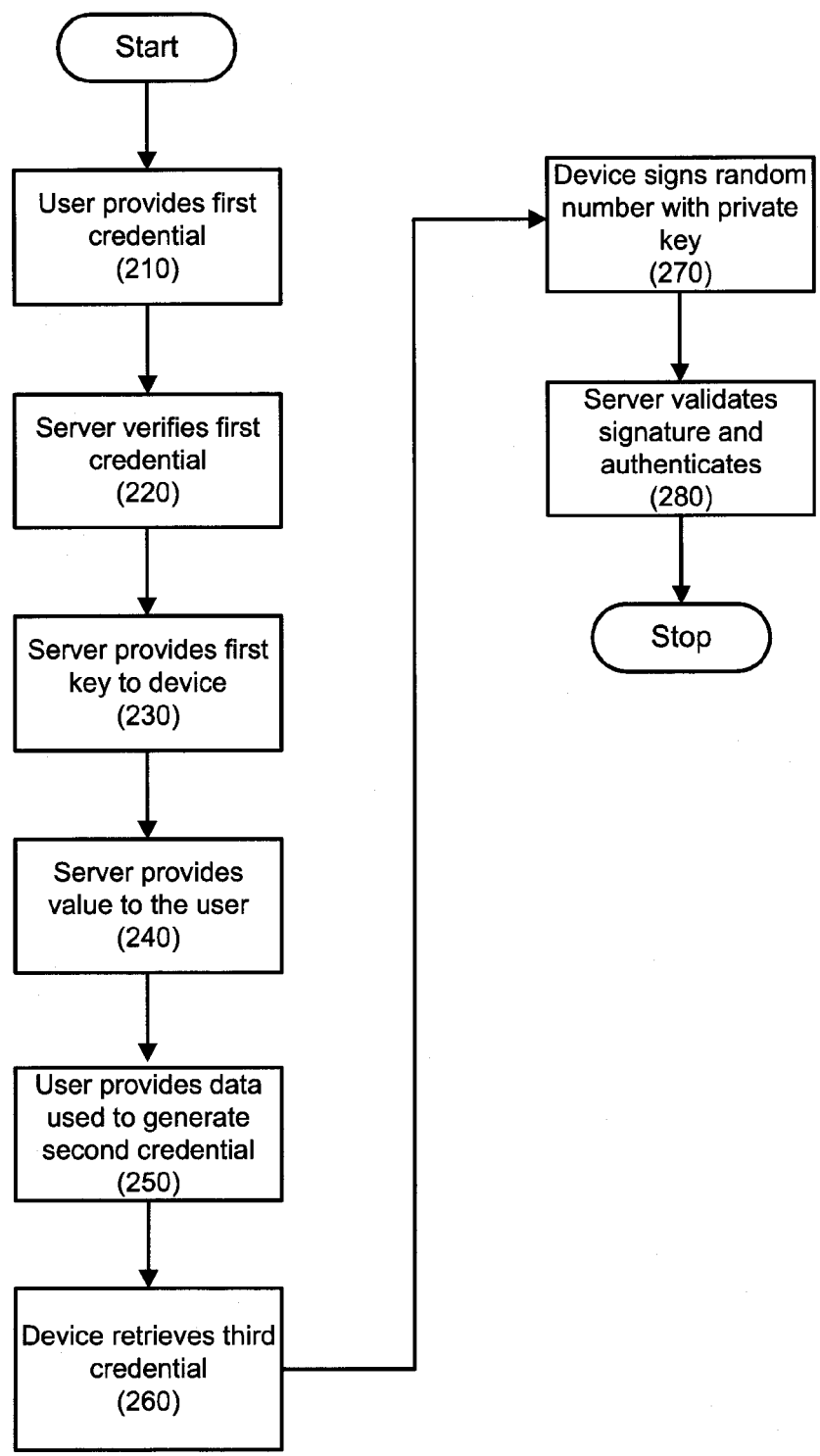
FIG. 2 discloses a flowchart depicting a method for mobile device registration according to one embodiment.

Referring to FIG. 2, a method for mobile device registration according to one embodiment is disclosed. In step 210, the user may provide a first credential for registration. The first credential may be a single element (e.g., voice biometric), or a collection of elements (e.g., voice biometric and large password extension, geographic information, device footprint, etc.), as described above.

In one embodiment, the server may check to see if the client device seeking to be registered has been rooted, altered, changed, etc. in a manner that would negate any protection that may be provided by the operating system of that device. For example, a rooted device may allow one application to access data stored in the sandbox, which is intended to be separate and/or private to a different application. In one embodiment, if such rooting/alteration is detected then the registration process may simply stop. In one embodiment, the device may perform the root check in step 210, and may provide the result to the server in step 220. In one embodiment, the server will not proceed with authentication if it determines that the client device is rooted. In one embodiment, the client discovers that authentication did not work, but does not discover the cause, e.g., rooted phone, failed to authenticate one credential, failed to authenticate multiple credentials, combination of the above, etc.

In step 220, the server receives and verifies the first credential. In one embodiment, this may involve checking a database for the at least one registered characteristic. In one embodiment, where variations in the characteristic are possible (such as with voice recognition), an algorithm that accounts for such variations may be used.

In one embodiment, as noted above, the first credential may include several elements. In one embodiment, the server may validate the first credential only if all of the elements match. In another embodiment, the server may validate the first credential if fewer than all elements match so long as the number of matching elements is within a defined tolerance, if specific elements match, etc. For example, if the first credential includes eight elements, validation may be successful if seven elements match.

In one embodiment, the failure to match a certain element (e.g., a client device serial or registration number) may result in a failed validation.

As noted above, suitable commercially-available voice authentication software include VoiceVault Fusion by VoiceVault, VoiceVerified by CSID, VocalPassword™ and FreeSpeech™ from Nuance.

In one embodiment, the validation of the first credential may leverage biometric authentication software that may consult a database for information associated with each individual. For example, once the user is identified, the user's known devices, home address, work address, out-of-wallet challenge questions/responses, account numbers, etc. may be retrieved for potential future use.

In one embodiment, the user may be requested to provide a variable response as part of the first credential, where "variable" means a response that differs from what has been trained or recorded. For example, if voice authentication is used, the user may register certain words of phrases with the server. During authentication, however, the user may be asked to repeat words or phrases that differ from those that were registered. The server may analyze the entered voice and determine if the spoken voice matches the registered voice.

In one embodiment, the user may be prompted to speak a "secret" phrase or password/passcode. In one embodiment, the user may be requested to use the secret phrase in a sentence for additional security. For example, if the user's passcode is "cat," the user may say "I just saw a cat walk down the street." In one embodiment, the credential may include a PIN, password, or passphrase known only to the legitimate user which is spoken when authenticating. Voice recognition ensures that the user spoke the correct PIN, password, or passphrase. In one embodiment, the system simultaneously voice recognizes to ensure that the user spoke the correct PIN, password, or passphrase, and additionally applies a voice biometric authentication to ensure that the PIN, password, or passphrase was uttered by the correct voice.

In step 230, if the first credential (or the elements thereof) is verified, the server may provide a first key (SK1) to the client device. In one embodiment, the first key may be a symmetric key. The symmetric key is used in a symmetric cryptographic algorithm such as AES or Triple-DES. Other keys and/or types of keys may be provided as necessary and/or desired.

In step 240, the server may provide a value to the user. In one embodiment, the value may be a random number that is generated by the server. In one embodiment, the value may be a 256-bit random-appearing number. In another embodiment, the server may provide a string representing a transaction or collection of transactions to the user. In another embodiment, the server may provide a message digest of a string representing a transaction or collection of transactions to the user. In another embodiment, in order to protect the user from inappropriate uses of a digital signature, the value may also contain a string whose purpose is to invalidate a transaction signature, e.g., "this string is only signed at authentication and is not used in combination with a digital signature of one or more transactions."

In one embodiment, the server may ask the user (or the applicant executing on the client device) to digitally sign the value. The server may validate the signature of the value to prove that the user controlled the keys required to create a correct digital signature, and the user signed the right value.

In one embodiment, the server may provide a unique receipt after validating the first credential. In one embodiment, this signed receipt may include a digitally signed message digest of information pertaining to the voice biometric event, and may also include other aspects, such as the date and/or time, and a unique event number, etc.

In one embodiment, the server may store the unique receipt in a log. In one embodiment the log is tamperproof created using a write-only device.

In step 250, the user may enter, or provide, data that may be used to generate a second credential. As discussed above, the data for the second credential may be entered by the user as a pattern, a code, a password, a gesture, etc. The system may generate second key (SK2) based on the second credential. For example, the data may be processed using a cryptographic hash function.

A cryptographic hash function is an algorithm that takes an arbitrary block of data and returns a fixed number of bits (called the "message digest).

In one embodiment, other factors, such as the velocity of the finger swipe, the width of the finger swipe, the angle of the device while swiping, other motions (e.g., shaking or turning the device measured by accelerometers, etc.) may be used in collecting data to be used in generating the third credential.

As noted above, the type of data for generating the second credential may be dependent on the device type and/or device ergonomics.

In step 260, the device may retrieve the third credential from the device. As described above, the third credential may be something that is in the possession of the user and/or stored on the device that is being registered. In one embodiment, the third credential may stored on a token, a fob, a memory card (e.g., micro-SD, SD, etc.) a USB device, a separate device, the private file system of a mobile device, etc. In another embodiment, the server may send, for example in step 230, an unlock code as opposed to a key, where the unlock code allows the token, fob, memory card, USB device, etc. to operate. In this case, the third credential may only be used to create signatures after being unlocked.

In one embodiment, the third credential may be an asymmetric private key ("private-key") that may be encrypted with two keys SK1 and SK2. For example, private-key may first be encrypted with second key (SK2), and then encrypted with the first key (SK1). This may be represented as follows: {{private-key}SK2}SK1.

Figure 3:
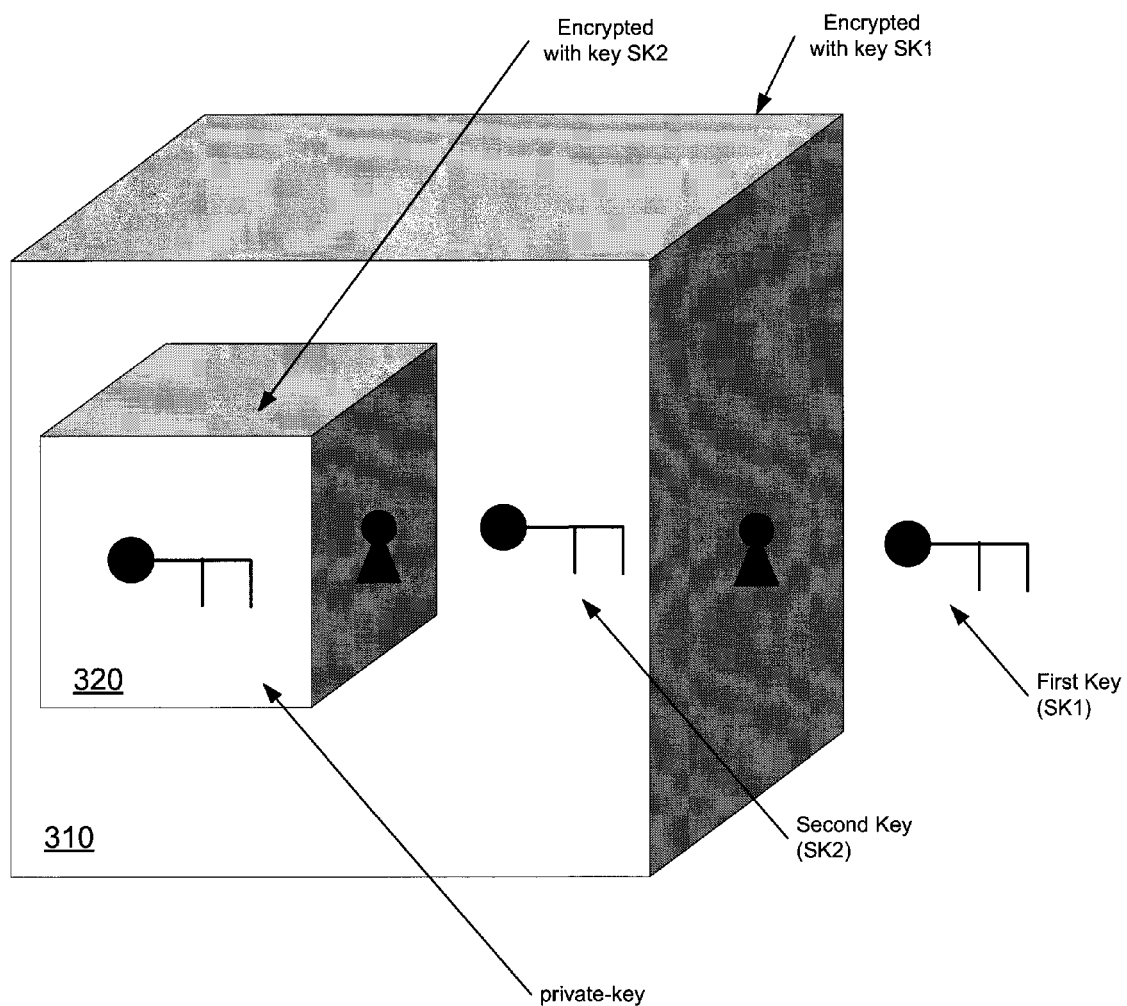
FIG. 3 discloses a conceptual diagram of the security according to one embodiment.

Referring to FIG. 3, a conceptual diagram of the security provided for the private key is provided. In one embodiment, the device holds a private key, which may be an asymmetric private key, that is encrypted with second key (SK2), which may be a symmetric key. The encrypted private key encrypted with SK2 may also be encrypted with first key SK1. This may be represented as follows: {{private-key}SK2}SK1.

In one embodiment, the client (e.g., desktop, laptop, or notebook computer (or similar device), tablet computer, phone/PDA) may apply key SK1 to "outer box" 310 to reveal {private-key}SK2. Next, the client may apply key SK2 to "inner box" 320 to reveal private-key.

In one embodiment, {{private-key}SK2}SK1 may reside on the non-volatile storage for the client. In one embodiment, {{private-key}SK2} and private-key may only be revealed in volatile storage and may be deleted as soon as they are no longer needed in a signature or authentication operation. In one embodiment SK2 is provided to the device in step 230. In one embodiment, SK1 is computed through an algorithm executed over the third credentials. For example, after entering the information the user knows, the device applies a message digest, and the result of the message digest is SK1. In one embodiment, SK1 and SK2 may be cryptographic keys that use a symmetric encryption algorithm, such as AES. By first decrypting using AES and SK1 and then decrypting using AES and SK2, the private key may be revealed in plaintext within the device's memory. Other symmetric algorithms may also be used, for example, Triple-DES, etc.

In one embodiment, the server may change private-key periodically or as necessary and/or desired. This may be done without user interaction once the device decrypts. First, the user may obtain first key (SK1) and second key (SK2). This may be part of the login sequence. The client may generate a new asymmetric key pair, such as private-key-A, public-key-A. The client may use first key (SK1) and second key (SK2) to encrypt the new private-key-A and replace the old encrypted private-key. Also, the client may send to the server a signature using private-key of public-key-A (along with public-key-A). In other words, the client replaces the private key, and additionally signs a copy of the new public-key-A to the server. After private-key is retrieved, the mobile device may use private-key in subsequent authentication and signature operations.

Other encryption methods may be used as necessary and/or desired. For example, in another embodiment, the asymmetric key may be encrypted with key SK1-B, where SK1-B=SHA-256 (SK1 concatenated with SK2). To obtain SK1-B, the client device first obtains the first key (SK1) from the server, and then generates SK2 from the second credential. The client may then compute SK1-B, and decrypt yielding the asymmetric key.

In another embodiment, the device may store a plurality of asymmetric private keys encrypted as above. For example, in the case of two asymmetric keys, this may be represented as: {{asymmetric-key-1}SK2-1}SK1-1 and {{asymmetric-key-2}SK2-2}SK1-2}.

Referring again to FIG. 2, in step 270, the device may generate and sign a random number with the unlocked, or decrypted, private-key. In one embodiment, the device may generate and sign the string representing the transaction or collection of transactions. In another embodiment, the device may generate and sign the message digest of the string representing the transaction or collection of transactions.

Figure 4:
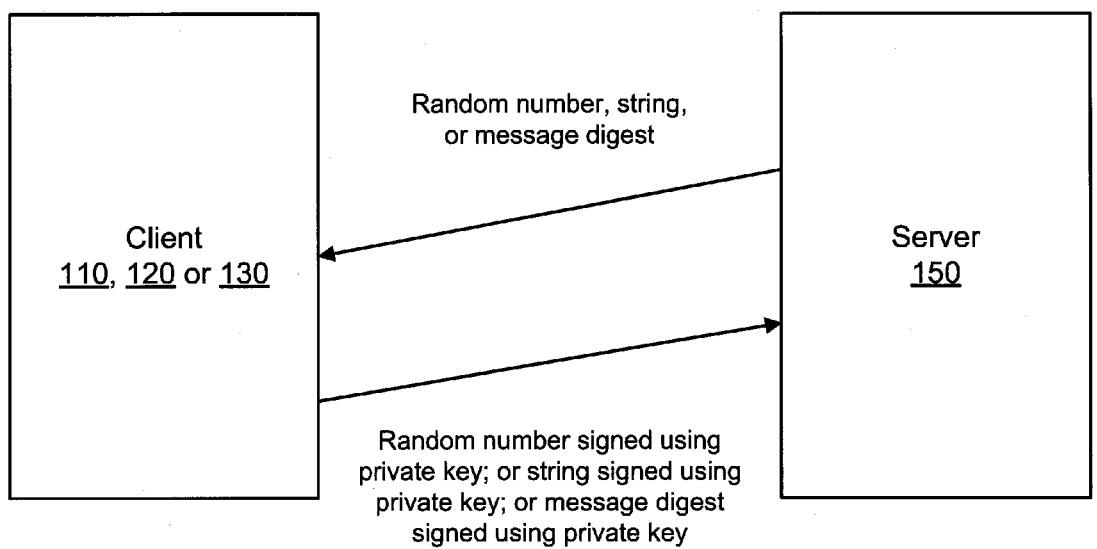
FIG. 4 discloses a flow diagram of an authentication method according to one embodiment.

Referring to FIG. 4, for example, in one embodiment, once the client has retrieved private-key, the client may accept a random number, a string, or a message digest. The client may apply private-key to create a digital signature.

As noted above, in one embodiment, the client device may hold a plurality of encrypted private keys. For example, if the client device holds two private keys (private-key-1 and private-key-2), the client device may use SK1-1 and SK2-1 to decrypt private-key-1. Then, the device may use private-key-1 to digitally sign the value that is provided from the server.

Next, the client device may delete private-key-1 from its memory, and may use SK1-2 and SK2-2 to decrypt private-key-2. The device may use private-key-2 to digitally sign the value provided by the server that has already been signed with private-key-1. In other words, the value from the server is first signed by private-key-1, and later signed by private-key-2.

Next, the device may delete private-key-2 from its memory. In one embodiment, when deleting private-key-1 and private-key-2 from memory, the device may retain the encrypted private keys in non-volatile storage.

If an adversary attacks in order to disclose the private key or dump the contents of memory to non-volatile storage for subsequent forensic data collection, then the adversary may only identify one of the plurality of private keys. Since the device only decrypts one private key at a time, the adversary never has the ability to try to discover all private keys at once because only one private key exists in decrypted form at any particular point in time.

Referring again to FIG. 2, in step 280, the server may validate the signature. The validation may use the public key that was provided by the client device when the device was registered, or the public key that has replaced that key. In one embodiment, the server may validate that the random number, string, or message digest of the string is the one provided. In one embodiment, the server may require a plurality of signatures, with one signature produced by each of the client's private keys. Thus, if the client has n private keys, then the server rejects any attempt at validation unless all n signatures are validated.

In one embodiment, the order of entry for the first credential and the data used to generate the second credential, and any other credentials, may be altered as necessary and/or desired. For example, sometimes the first credential may be entered first, whereas other times the data used to generate the second credential may be entered first. While the order from a user interface may be any possible order, the cryptographic arrangement may require a precise order. Thus, if the user enters data used to generate the second credential by entering a pattern on the screen, and the device later obtains the first key from the server, the client device may need to cache, or store, the data used to generate the second credential, or the second credential itself, until the first key is received. In one embodiment, the client may delete all keys from memory when they are no longer needed.

In one embodiment, if the registration and/or authentication fails, the server may prevent the user from registering any other devices until the user is re-authenticated. For example, the user may be instructed to access the account from a desktop, laptop, or other already authenticated device. In another embodiment, the server may mark the public key associated with the user's device as invalid, and subsequently fail to validate any authentication or signature event using this public key. In effect, once marked as invalid, the device can no longer authenticate or perform signatures until the device re-registers new cryptographic keys.

In another embodiment, the server may remotely lock the device. In still another embodiment, the server may send a message to the registered user informing him or her of the failed authentication. In one embodiment, this may be transmitted on a different transmission mechanism (e.g., text message, email, phone, etc.).

In one embodiment, different devices may use different authentication credentials. For example, a desktop computer may use one set of credentials, such as a password and a SecureId value, and a mobile device, tablet computer, etc. may use the three (or four) credentials discussed above.

In one embodiment, at any stage of the registration or authentication process, the mobile application may validate the certificate of the server. This may enhance security by prohibiting most man-in-the-middle attacks.

Figure 5:
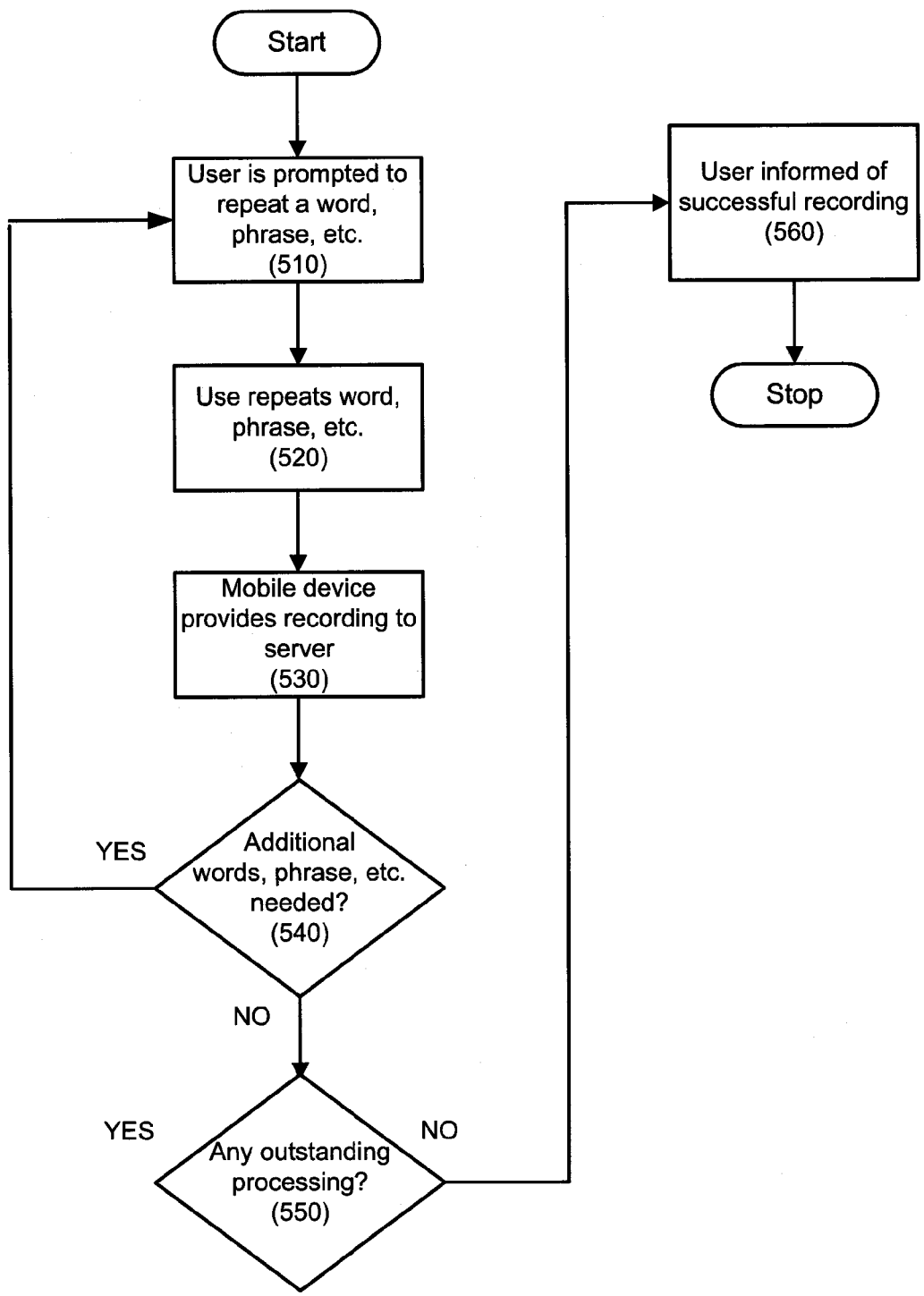
FIG. 5 discloses a method of collecting data for a user to be used in device registration according to one embodiment.

Referring to FIG. 5, a method of collecting data for a user to be used in device registration is provided.

Figure 6A:
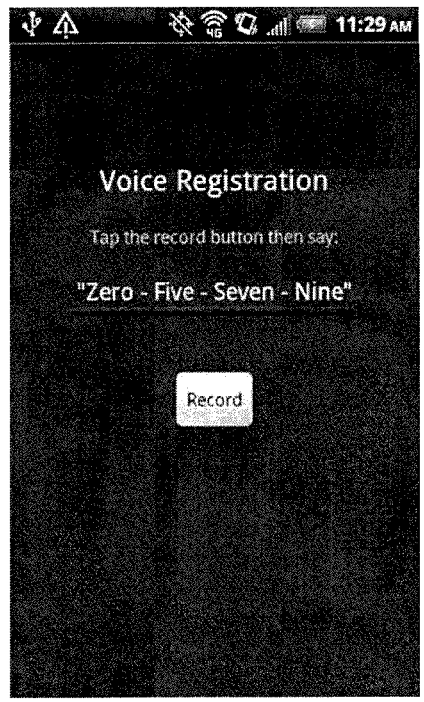
FIGS. 6a and 6b disclose exemplary screenshots of a voice registration process according to embodiment.
Figure 6B:
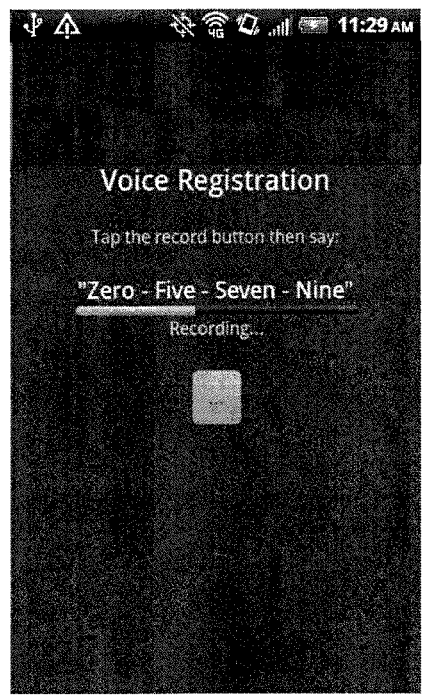

Referring to FIG. 5, a method for voice recognition training is provided. In step 510, an application executed by a mobile device prompts the user to repeat a certain phrase. For example, the user may be prompted to repeat "zero-five-seven-nine." An example screen shot of this is shown in FIG. 6a.

In step 520, the user may repeat the phrase. In exemplary FIG. 6b, the user may tap the screen to begin recording, and the screen may provide an indication of the recording.

In step 530, the mobile device may provide the recording to a server.

In step 540, the mobile device and/or the server determines if additional words, phrases, etc. are necessary. If yes, then the mobile device returns to step 510.

In step 550, the mobile device and/or the server determines if additional processing is necessary to complete the recording or entry.

In step 560, the user is informed of a successful recording or entry. In one embodiment, a successful recording means that some utterance was recorded, but it does not necessarily mean that the server will validate the recording as being from the correct device.

In one embodiment, the server may have an asymmetric key pair, (server-private, server-public). The server may keep server-private for itself, and may provide the client device with server-public. After creating a recording of the user's utterance, the client device may generate an ephemeral symmetric key, or "esk" and use esk to encrypt the recording of the user's utterance or any other sensitive information. The client may encrypt the recording with esk, and may encrypt esk with server-public. The client may then delete esk and the cleartext recording from its memory.

The client may next write [{recording}esk, {esk}server-public] to its non-volatile storage, and send [{recording}esk, {esk}server-public] as part or all of the first credential. Note that once the client deletes esk and the cleartext recording from its memory, the only party that can decrypt to yield the cleartext recording is a party with access to server-private, i.e., the server. This technique helps protect the privacy of the recording.

Figure 7:
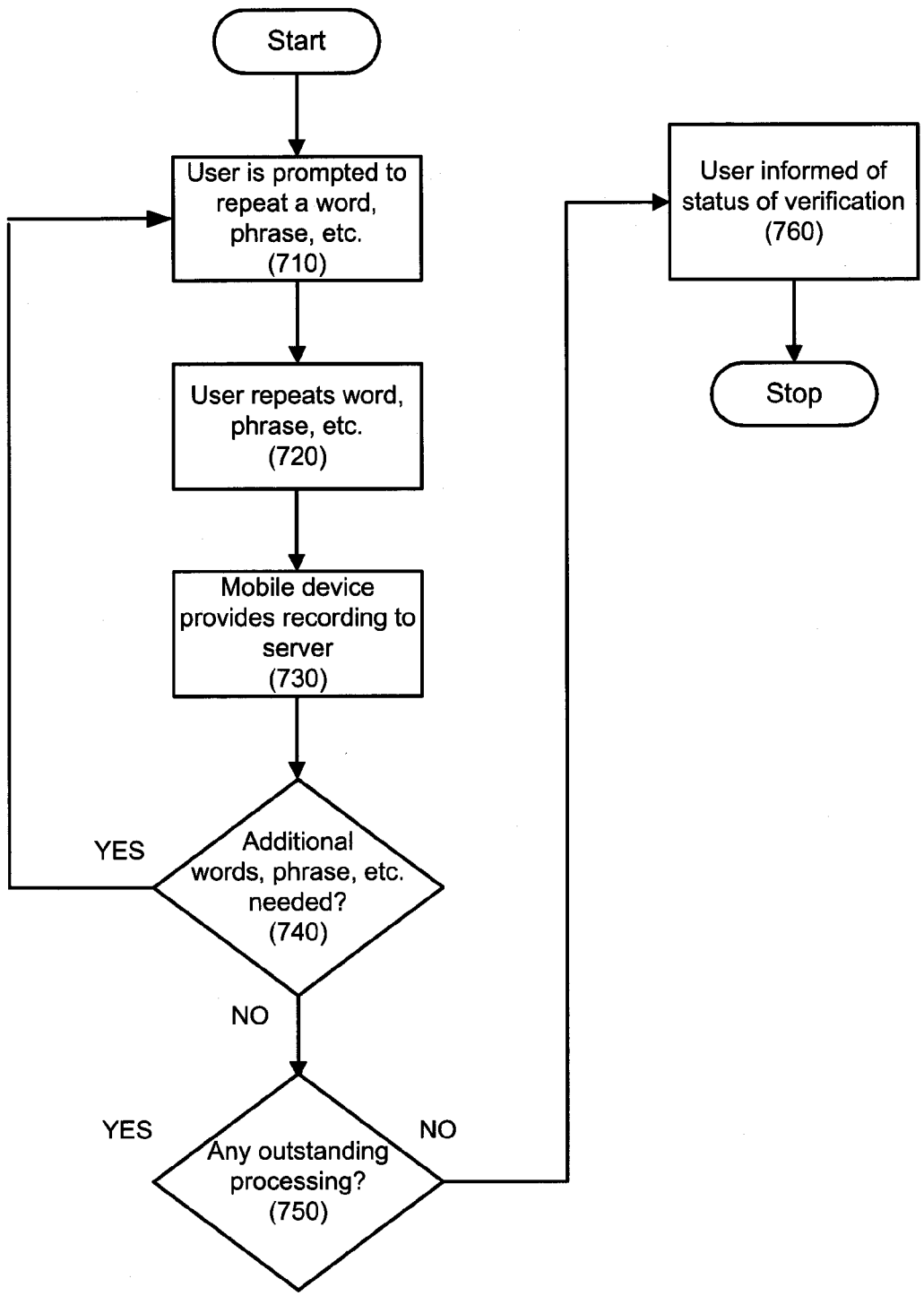
FIG. 7 discloses a method for verification of a user using a voice biometric according to one embodiment.

Referring to FIG. 7, a method for verification of a user using a voice biometric is provided. In step 710, an application executed by a mobile device prompts the user to repeat a certain word, phrase, etc. In one embodiment, the user may have already recorded this phrase during a training session. In another embodiment, the user may have recorded parts of a phrase.

For example, the user may be prompted to repeat "zero-five-seven-nine."

In step 720, the user may repeat the phrase as instructed.

In step 730, the mobile device may provide the recording to a server, and the server may validate the recording against the registered biometric pattern. If the biometric does not validate, then the user may have a limited number of attempts to validate the biometric. For example, the user may be given three tries to validate. If the biometric fails to validate after a certain number of attempts, then the server may automatically lock the user's account.

In one embodiment, an administrator of the server can unlock a user's account

In step 740, the mobile device and/or the server determines if additional words, phrases, etc. are necessary. If yes, then the mobile device returns to step 710.

In step 750, the mobile device and/or the server determines if additional processing is necessary to complete the recording or entry.

In step 760, the user may be informed of the status of the verification. If the registration was successful, another credential may be verified. In one embodiment, the verification fakes a success and shows fake data to the user by supplying the wrong decryption key. The purpose is to trick the holder into believing that the voice validation succeeded, when in reality the voice validation failed. Ultimately, the user discovers that he or she could not login; however, the user does not know whether the reason for the failure was an improper voice validation, device, swipe, etc. If any authentication material yields a failure, then the entire authentication event fails.

Figure 8A:
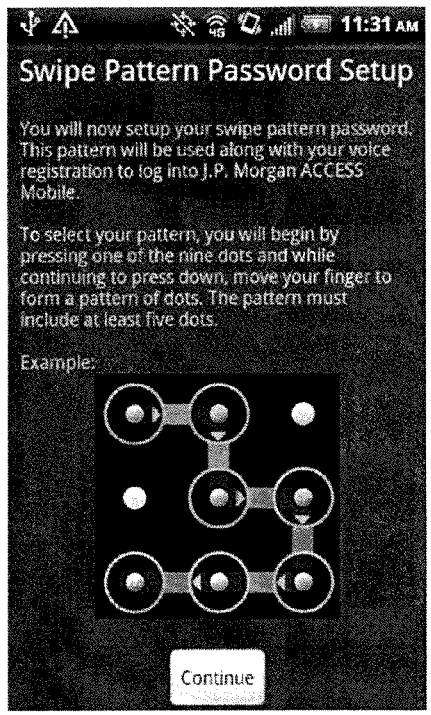
FIGS. 8a-8d disclose exemplary screenshots of a voice registration process according to embodiment.
Figure 8B:
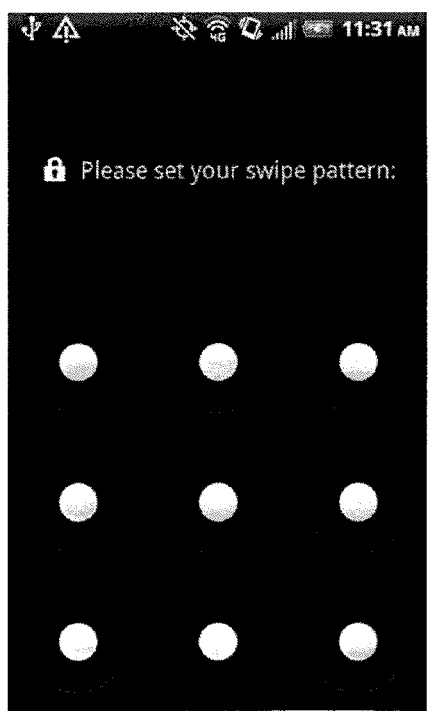
Figure 8C:
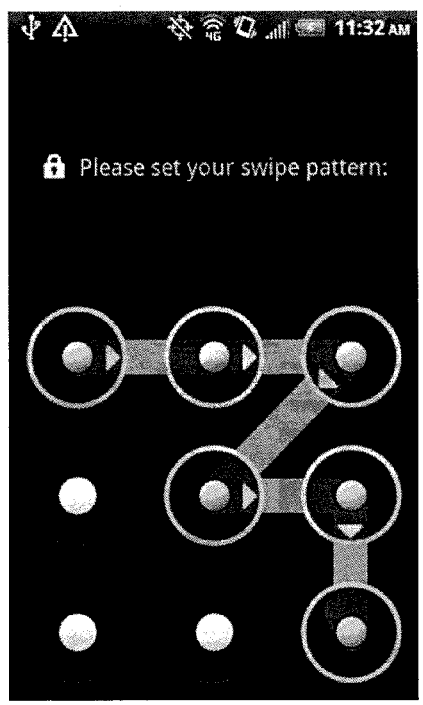

Referring to FIG. 8a-8d, exemplary screenshots of a swipe pattern registration credential are provided. In FIG. 8a, the user may have the concept of the swipe pattern explained. In FIG. 8b, the user may be prompted to set the swipe pattern. In FIG. 8c, the user's swipe pattern may be displayed for the user. In one embodiment, the pattern may not be displayed.

In one embodiment, the user may be asked to repeat the swipe pattern to verify that the user knows the swipe pattern.

Figure 8D:
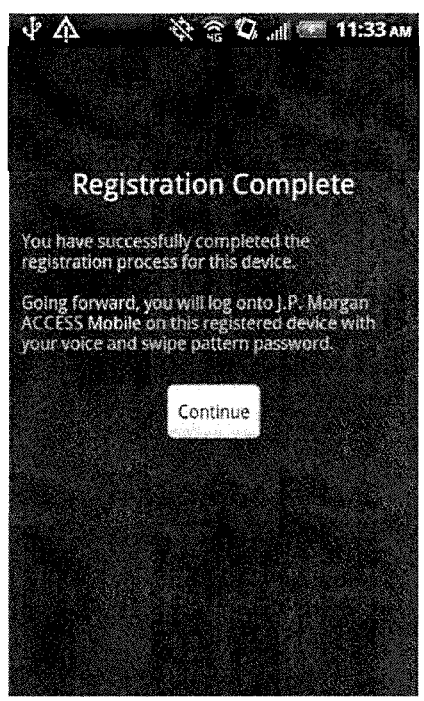

In FIG. 8d, the user may be informed of the successful registration.

In one embodiment, a secure process may be used to register a new device. The secure process assumes, in one embodiment, that the user already has at least one device securely registered, and the objective is to securely register an additional device. In one embodiment, a user may be able to register a limited number of additional devices during a session, over a particular time period, etc. In another embodiment, a user may be able to register a single desktop, a single mobile device, and a single tablet computer, but may not be permitted to register a second one of each of these devices.

For example, if the user tries to register a second device of a particular type (such as a second mobile phone), the registration may be declined. In another embodiment, the may be asked if he or she wants to de-register the first mobile phone.

In another embodiment, the user may be restricted to one brand of a type of device. For example, a user may register as many tablet computers as he or she may desire, but only one of each brand (i.e., only one iPad, only one Galaxy, etc.).

Figure 9:
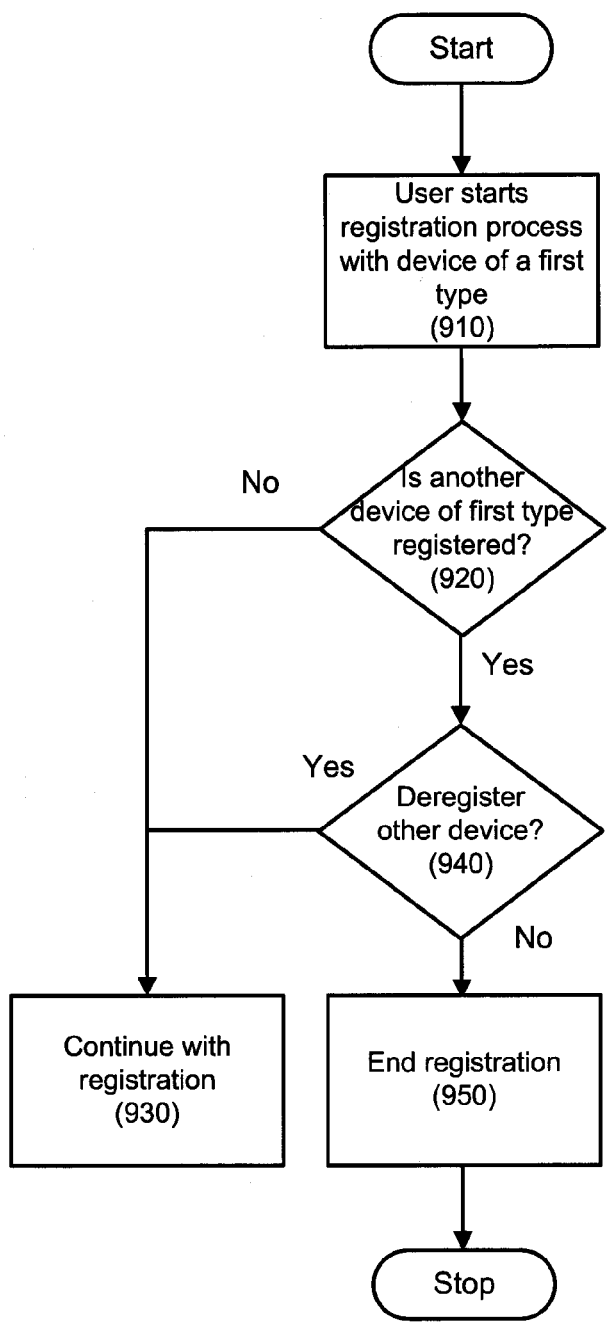
FIG. 9 discloses a method for checking device registration according to one embodiment.

For example, referring to FIG. 9, a method for checking device registration status is provided. In step 910, the user attempts to register a device of a first type.

In step 920, the server checks to see if a device of a first type is already registered.

In step 930, if no device of the first type is registered, the registration continues.

In step 940, if a device of a first type is already registered, the registration process may end.

In another embodiment, the user may be asked if he or she wishes to de-register the already-registered device. If the user wishes to de-register the already registered device, the registration process with the new device may continue.

If the user does not wish to de-register the already registered device, in step 950, the registration process may end.

In one embodiment, the server may require verification from another registered device before de-registering the already-registered device. In another embodiment, the server may send a notification to the already-registered device, to other registered devices, etc. informing of the de-registration. In still another embodiment, the user may be required to de-register the already-registered device using that device. If the already-registered device is not available (e.g., it was lost, stolen, etc.) then the de-registration may require human assistance from an agent.

Figure 10:
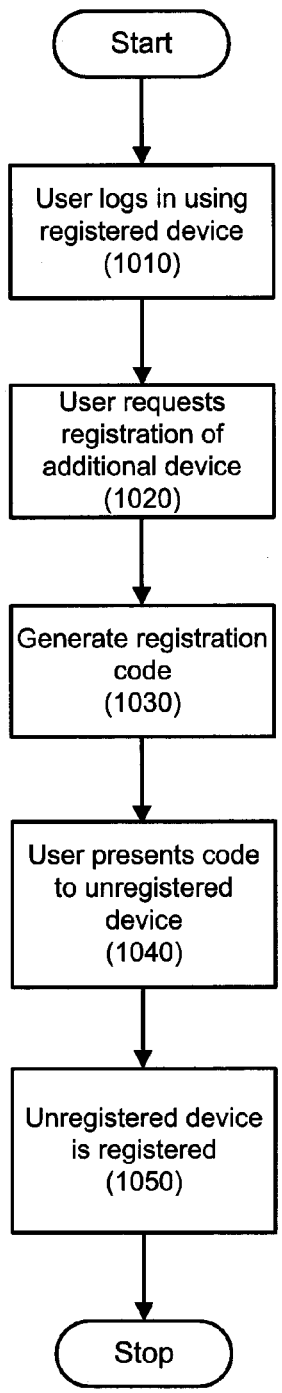
FIG. 10 discloses a method for device authentication using two devices according to one embodiment.

Referring to FIG. 10, a method of device registration using codes is provided. In step 1010, the user may first be required to log into an already registered device. In step 1020, after logging in to the registered device, the user may request to register a new device.

In step 1030, the server and/or the mobile device may generate a code, for example, a QR code, a bar code, a numeric code, an audible code, a visual code (e.g., blinking lights), etc. Other suitable codes may be used as necessary and/or desired.

In one embodiment, more than one code may be used. For example, a QR code may be presented along with an alphanumeric code.

In step 1040, the user may present the code(s) to the unregistered device. For example, the user may scan, record, image, key in, etc. the code into the unregistered device from the registered device.

If more than one code is provided, the user may enter the additional codes as necessary and/or desired.

After the device to be registered "reads" the QR code, bar code, numeric code, audible code, visual code, or manually entered code, in step 950, the unregistered device may register itself to the server by uploading the code or a representation of the code. The server may use the code to identify the user and create a database record that associates the user with the device to be registered.

In another embodiment, the registered device may present a code, such as a QR code, a bar code, a numeric code, an audible code, a visual code (e.g., blinking lights), etc. to an unregistered device. In one embodiment, the code may cause the unregistered device to navigate to a registration site for the server and enter the code, either manually or by scanning the code.

In another embodiment, the code may further include an embedded link to a registration process with the server. Thus, by entering and/or scanning the code, the device will be registered.

In one embodiment, once a device is registered, it does not need to be registered again. In another embodiment, the device must be registered each time it is used. In still another embodiment, every device must be re-registered periodically, on a random basis, or a necessary and/or desired.

In one embodiment, the registration/authentication process may be used with devices that are part of other devices, such as an automobile. The user may register a device in an automobile that may be used to pay tolls, pay for gasoline or service, etc.

In another embodiment, the keys may be updated, either transparently or non-transparently, to the user. Any other suitable action may be implemented as necessary and/or desired.

In one embodiment, if the registration/authentication fails, the user may be provided with an alternate means of registering and/or authenticating the device. In one embodiment, a user may user a Portable Security Transaction Protocol, or PSTP. The document entitled "Portable Security Transaction Protocol," Computer Networks Volume 51, Issue 3, 21 Feb. 2007, Pages 751-766 by Glenn Benson (available at http://dx.doi.org/10.1016/j.comnet.2006.06.004) is incorporated, by reference, in its entirety. Moreover, the disclosure of U.S. patent application Ser. No. 10/882,527 is incorporated, by reference, in its entirety.

In another embodiment, the user may be prompted to enter a variable code, such as from a SecureID token. Other alternative authentication and/or registration mechanisms may be used as necessary and/or desired.

Figure 11:
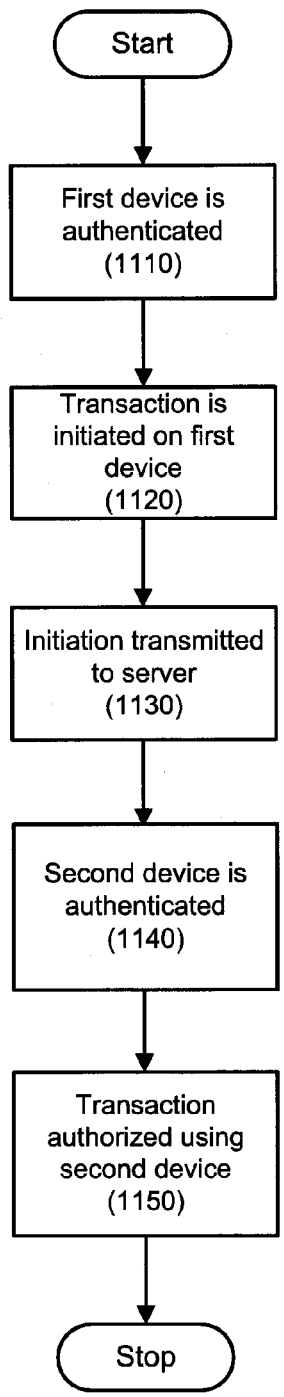
FIG. 11 discloses a method for two-device authorization according to one embodiment.

Referring to FIG. 11, a method of transaction initiation and approval using two devices is provided according to one embodiment. In step 1010, the user may authenticate on a first device. In one embodiment, the first device may be a desktop computer, mobile device, tablet computer, etc. In one embodiment, the techniques discussed above may be used in this authentication.

In step 1120, the user initiates a transaction, such as a payment, etc. from the first device.

In step 1130, the server receives the transaction initiation.

In step 1140, the user, or a second authorized user for the same account, may access a second device. The second device is a different device from the first device. The second device, however, may be of a different type from the first device (e.g., desktop computer versus tablet computer) or it may be the same (e.g., both tablet computers). In one embodiment, the user may authenticate the second device as discussed above.

In step 1150, the transaction may be authorized using the second device. In one embodiment, either or both of the transaction initiation and transaction authorization may be digitally signed by the private-key(s) on the client device, and the server validates using the corresponding public-key(s). The server may reject the transactions unless the signatures are validated.

In one embodiment, there may be a limit to the number and type of devices that may be registered.

In one embodiment, signature validation may also include the step of validating the certificate against a Certificate Revocation List or OCSP responder. In one embodiment, all signatures must cover one or more items, where at least one item is a voice biometric receipt or other biometric receipt. The server must validate that the receipt corresponds to the biometric validation of the event.

For example, the user first supplies a voice biometric as part of the first credential, and then the server provides the user with SK and the biometric receipt for this voice authentication event. The user may then correctly enter the third credential by, for example, swiping a pattern on the screen. The client device may then decrypt to discover the private-key. The client device may sign a transaction, the voice biometric receipt, and possibly other information, and the client device uploads the signature to the server.

The server may only validate if the signature is correct for the transaction and biometric receipt, the signed biometric receipt is the one in this sequence, and all other information that may be covered in the signature is correct. If the server cannot validate, then the server may stop without honoring the user's request. In one embodiment, the server may publish a policy where it fails all signature requests unless the server receives a plurality of signatures and the signatures cover a voice biometric receipt.

In one embodiment, the use case is an authentication operation. If step 280 yields a success, then authentication succeeds and the user is permitted to log in. If step 280 yields a failure, then the user's access is denied. In one embodiment, the use case is a digital signature operation. If the signature operation succeeds, then the server executes the requested transaction, e.g., financial payment. If the signature operation fails, then the server denies the requested transaction. In one embodiment, the value provided in step 240 may include a digital receipt that notes that the first credential or collection of credentials was properly validated by the server, e.g., the voice biometric, etc. In the authentication use case, by validating the signature in step 280, the server may simultaneously note that the server both validated the first and second credential. If the first credential includes a voice biometric, password, and a location, and the second credential may include at least one signature with an asymmetric key stored on the device, then the system simultaneously proves four-factor authentication. By removing one or more factors, the system may be used to simultaneously prove three factors, two factors, or one factor. Also, the signature operation may also prove one, two, three, or four factors of authentication.

In one embodiment, once a device is verified, the device may receive reports, thereby removing need to print reports. Include an unattended download capability whereby the report automatically resides on the tablet when the user first connects in the morning. Unattended download facility authenticates using a second certificate.

In another embodiment, alerts may be provided securely to the device after verification. Examples include account activities (e.g., deposits, withdrawals, etc.), pending authorizations, notifications of account access, password changes, changes of personal data (e.g., contact information, etc.).

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ 7 operating system, the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

We claim:

1. A method for authentication of a device, comprising:
   receiving, at a mobile device, a first credential;
   transmitting, over a network, the first credential to a server;
   receiving, from the server, a first key and a first value;
   receiving, at the mobile device, a data entry for a second credential;
   generating, by a processor, a second key from the data entry;
   retrieving, by the mobile device, a third credential using the first key and the second key;
   signing, by the mobile device, the first value with the third credential; and
   transmitting, over the network, the signed first value to the server.

2. The method of claim 1, wherein the first credential comprises a biometric.

3. The method of claim 2, wherein the biometric is a voice biometric.

4. The method of claim 1, wherein the first credential comprises at least one of a value, a device footprint, and a geographic location for the device.

5. The method of claim 1, wherein the first key is a symmetric key.

6. The method of claim 1, wherein the second key is generated by applying a cryptographic hash function to the data entry.

7. The method of claim 1, wherein the second key is an asymmetric key.

8. The method of claim 1, wherein the third credential is encrypted with the second key, and further encrypted with the first key.

9. The method of claim 1, wherein the third credential is an asymmetric key.

10. The method of claim 1, wherein the second key is stored on one of removable memory, a fob, a token, and a USB device.

11. The method of claim 1, further comprising:
    encrypting the first credential before transmitting the first credential to the server.

12. The method of claim 1, further comprising
    generating, at the mobile device, a second value;
    signing the second value with a device key; and
    transmitting, to the server, the signed second value.

13. The method of claim 1, wherein the first value comprises a receipt for the first credential.

14. The method of claim 1, wherein the first value comprises a receipt for the first credential and at least one of a message digest for a transaction and a random number.

15. The method of claim 1, wherein the first value comprises a string to invalidate a transaction signature.

16. The method of claim 1, further comprising:
    signing, by the mobile device, a second value with the third credential; and
    transmitting, over the network, the signed second value to the server.

17. The method of claim 1, wherein the first credential is used with a second server.

18. The method of claim 1, wherein the third credential is used with a second server.

19. The method of claim 1, wherein the first credential and the third credential are used with a second server.

20. The method of claim 1, further comprising:
    transmitting, over a second network, the first credential to a second server;
    receiving, from the second server, a second server first key and a second server first value, the second server first value comprising a second server receipt for the first credential;
    receiving, at the mobile device, a second data entry for a second server second credential;
    generating, by the processor, a second server second key from the second data entry;
    retrieving, by the mobile device, a second server third credential using the second server first key and the second server second key;

signing, by the mobile device, the second server first value with the second server third credential; and transmitting, over the second network, the signed second server first value to the second server.

21. The method of claim 20, wherein the first credential comprises a biometric.

22. The method of claim 20, wherein the second server first key is a symmetric key, the second server second key is an asymmetric key, and the second server third credential is an asymmetric key.

23. The method of claim 1, further comprising:

receiving, at the mobile device, a second server first credential;

transmitting, over a second network, the second server first credential to a second server;

receiving, from the second server, a second server first key and a second server first value, the second server first value comprising a receipt for the second server first credential;

receiving, at the mobile device, a second data entry for a second server second credential;

generating, by the processor, a second server second key from the second data entry;

retrieving, by the mobile device, a second server third credential using the second server first key and the second server second key;

signing, by the mobile device, the second server first value with the second server third credential; and transmitting, over the second network, the signed second server first value to the second server.

24. The method of claim 23, wherein the first credential and the second server first credential each comprise a biometric.

25. The method of claim 23, wherein the first credential and the second server first credential are the same type of biometric.

26. The method of claim 25, wherein the first credential and the second server first credential are both voice biometrics.

27. The method of claim 23, wherein the second server first key is a symmetric key, the second server second key is an asymmetric key, and the second server third credential is an asymmetric key.

28. A method for authentication of a device, comprising:

receiving, at a mobile device, a first credential;

transmitting, over a network, the first credential to a server;

receiving, from the server, a first key and a first value comprising a receipt for the first credential;

receiving, at the mobile device, a data entry for a second credential;

generating, by a processor, a second key from the data entry;

retrieving, by the mobile device, a third credential using the first key and the second key;

signing, by the mobile device, the first value with the third credential; and transmitting, over the network, the signed first value to the server.

29. The method of claim 28, wherein the third credential is retrieved from a device that is separate from the mobile device.

30. The method of claim 28, wherein the third credential is retrieved from one of a token, a fob, a memory card, and a USB device.

* * * * *